United States Patent
Palm

[11] Patent Number: 5,568,379
[45] Date of Patent: Oct. 22, 1996

[54] METHOD FOR CONTROLLING DYNAMIC NTH-ORDER SYSTEMS

[75] Inventor: Rainer Palm, München, Germany

[73] Assignee: Siemens Aktiengesellschaft, Munich, Germany

[21] Appl. No.: 244,405

[22] PCT Filed: Sep. 18, 1992

[86] PCT No.: PCT/DE92/00804

§ 371 Date: May 23, 1994

§ 102(e) Date: May 23, 1994

[87] PCT Pub. No.: WO93/11473

PCT Pub. Date: Jun. 10, 1993

[30] Foreign Application Priority Data

Nov. 25, 1991 [DE] Germany ............ 41 38 662.0

[51] Int. Cl.$^6$ .................................. G05B 13/00
[52] U.S. Cl. .................. 364/176; 364/148; 364/153; 395/900
[58] Field of Search .................. 364/152–157, 364/160–163, 172–177, 148; 395/900, 903–905

[56] References Cited

U.S. PATENT DOCUMENTS

| | | | |
|---|---|---|---|
| 4,864,490 | 9/1989 | Nomoto et al. ............... | 364/157 |
| 4,903,192 | 2/1990 | Saito et al. .................... | 364/157 |
| 5,166,873 | 11/1992 | Takatsu et al. ............... | 364/151 |
| 5,247,432 | 9/1993 | Ueda ............................ | 364/162 |
| 5,251,124 | 10/1993 | Matsunaga ................... | 364/176 |
| 5,267,144 | 11/1993 | Yoshida et al. ............... | 364/174 |
| 5,410,470 | 4/1995 | Yamaoka et al. ............. | 364/165 |

FOREIGN PATENT DOCUMENTS 3123902  5/1991  Japan.

OTHER PUBLICATIONS

"Implementation of VSS Control to Robotic Manipulators—Smoothing Modification", Jian–Xin Xu et al, IEEE Electronics, vol. 36, No. 3, Aug. 1989, New York, pp. 321–329.
"Fuzzy Logic Control For Variable Structure Systems", A. Knafel et al, IEEE International Conference on Systems Engineering, Aug. 1989, pp. 419–422.

Primary Examiner—Roy N. Envall, Jr.
Assistant Examiner—Thomas E. Brown
Attorney, Agent, or Firm—Hill, Steadman & Simpson

[57] ABSTRACT

In this controller, a manipulated variable is produced as a sum of a linear compensation term and a product term, the compensation term being a linear combination of a contouring error and its time derivatives, and the product term being formed by multiplying a fuzzy control term by a saturation term. This controller combines the advantages of the sliding-mode controller with boundary layer and those of the fuzzy controller, and thus represents a robust controller for a wide class of nonlinear nth-order systems.

3 Claims, 2 Drawing Sheets

METHOD FOR CONTROLLING DYNAMIC NTH-ORDER SYSTEMS

BACKGROUND OF THE INVENTION

Known controlling systems for dynamic systems used in technology are either designed purely conventionally on the basis of linear or nonlinear system models, or consist of pure fuzzy control controllers. Each of the two fundamentally dissimilar approaches has its own typical advantages and disadvantages in this regard. The so-called sliding mode controllers with boundary layer stand particularly from among the conventional controlling systems, since these most readily do justice to the requirements for robustness and the involvement of a minimum of system knowledge (J. F. Slotine: The Robust Control of Robot Manipulation; The Intern. Journ. of Robotics Research (MIT), Vol. 4, No. 2, 1985, pages 49–64). These controllers are conventional controllers for higher-order (n>=2) systems, which have a compensation component for system nonlinearities and a boundary layer around the sliding surface (SS), in order to achieve a continuous%change in sign of the manipulated variable. A precondition for designing a controller of this type is to how the upper limits of the model uncertainties, parameter fluctuations, disturbances and frequencies which occur. A disadvantage of this controller is that a relatively deep knowledge of the nonlinear system components is a precondition for designing the compensation component, and this greatly restricts the variability of a controller of this type once it has been set.

An alternative to conventional control principles is provided by the fuzzy controllers, which are frequently designed on the basis of a two-dimensional phase plane (Mamdani. E. H. and Assilian S.; Art Experiment in Linguistic Synthesis with a Fuzzy Logic Controller; In: E. H. Mamdani & B. R. Gaines, Fuzzy Reasoning and its Applications, London, Academic Press, 1981, pages 311–323). These operate in principle like sliding-mode controllers with a boundary layer (S. Kawaji, N. Matsunaga: Fuzzy Control of VSS Type and its Robustness; IFSA 91, Brussels, Jul. 7–12, 1991, preprints vol. "engineering" pages 81–88) and, like them, likewise require for their design information on upper limits of the model uncertainties, parameter fluctuations, disturbances and frequencies. No compensation of linear or nonlinear components is performed. Control is performed exclusively by fuzzy rules which are derived heuristically from the phase plane. A disadvantage of these controllers is their limitation to pure fuzzy rules without taking account of easily implementable compensation components and without including additional filters such as, for example, a boundary layer. Furthermore, most fuzzy controllers are limited to processing an error and the timed derivative thereof in second-order systems (K. L. Tang, R. J. Mulholland: Comparing Fuzzy Logic with Classical Controller Designs; IEEE Trans. on Syst., Man and Cybernetics, Vol. SMC-17, No. 6, November/December 1987, pages 1085–1087). In the case of such fuzzy controllers, increasing the order leads to an exponentially growing increase in the number of rules. A further disadvantage of these controllers is that, as in the case of sliding-mode controllers without a boundary layer, a discontinuous change in sign (chattering) of the manipulated variable cam take place at the edges of the normalized phase plane,i and this leads to an undesired loading of the actuators. In addition, fuzzy controllers, whose membership functions are not tuned finely enough in the vicinity of the sliding surface, tend to undesired limit cycles.

It is the object of the invention to specify a controller for dynamic nth-order systems which combines the advantages of the sliding-mode controller with boundary layer and those of the fuzzy controller, that is to say a robust controller for a wide class of nonlinear nth-order systems which, operating on the basis of fuzzy rules on the one hand and of conventional, crisp control on the other hand, combines the advantages of the two technologies.

SUMMARY OF THE INVENTION

This object is achieved by means of a method for controlling dynamic nth-order systems.

In this controller, a manipulated variable is produced as a sum of a linear compensation term and a product term, the compensation term being a linear combination of a contouring error and its time derivatives, and the product term being formed by multiplying a fuzzy control term by a saturation term.

In this way, the fuzzy controller is extended by a control term which compensates a specific, easily accessible linear system component. Furthermore, a boundary layer is introduced which permits a continuous change in sign of the manipulated variable in the entire operating range. Finally, the method of fuzzy control is hereby extended to system orders >2. The controller design according to the invention follows the principles of the controller design for sliding-mode controllers with boundary layer, and thereby guarantees the stability of the controlled system as well as its robustness with respect to unmodeled frequencies.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENT

Figure 1:
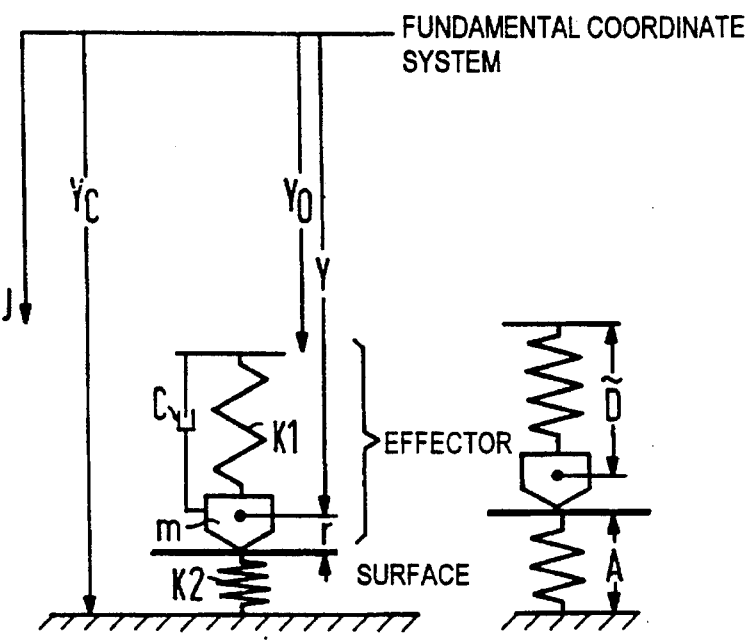
FIG. 1 shows in a schematic way a simple example of a dynamic system which can be appropriately controlled by means of a controller according to the invention.

The invention is described in more detail below with the aid of a preferred exemplary embodiment.

A. Controller Design

The controller design proceeds from a nonlinear nth-order system:

$$x^{(n)} = f(\underline{x},t) + u + d(t) \qquad (1)$$

where $$\underline{x}(t) = (x, x^{(1)}, \ldots, x^{(n-1)})^T$$

x(t)-state vector; d (t)-disturbances; u-manipulated variable. f($\underline{x}$,t)-nonlinear system components.

Furthermore, the upper bounds $F(\underline{x},t)$, $D(\underline{x},t)$ and $v(t)$ are known as $$|f(\underline{x},t)|<=F^-(\underline{x},t);$$

$$|d|<=D(\underline{x},t);$$

$$|x_d^{(n)}(t)|<=v(t) \quad (2)$$

where
$x_d$-desired value.
The contouring error (tracking error) may be given as $$e=\underline{x}(t)-\underline{x}_d(t)=(e,e^{(1)},\ldots,e^{(n-1)})^T \quad (3)$$

In addition, let $$s(\underline{x},t)=(d/dt+\lambda)^{(n-1)}e=0; \lambda>=0 \quad (4)$$

be a sliding surface (SS). If success is achieved in determining the manipulated variable u by a controller such that $$\tfrac{1}{2}d/dt(s^2(\underline{x},t))<=-\eta|s|; \eta>=0 \quad (5)$$

the system behaves such that the error vector vanishes in finite time independently of unmodeled system components and disturbances. This condition (5) always forces the state vector in the direction of SS. If it is located on the SS, it slides in a finite time which depends on the selected $\lambda$ in equation (4) and the maximum manipulated variable $|u_{max}|$ in the zero point of the phase plane, which is defined by the components of the error vector $\underline{e}$.

One controller which performs this is $$u=-\Sigma_{k=1,\ldots,n-1}\binom{n-1}{k}\lambda^k e^{(n-k)} - K_{Fuzz}(e,\lambda)sat(s/\Phi) \quad (6)$$

where $$sat(s/\Phi)=\begin{pmatrix} s/\Phi \text{ for } |s/\Phi|<1 \\ sgn(s/\Phi) \text{ for } |s/\Phi|>=1 \end{pmatrix}$$

$\Phi$-strength of the BL
$K_{Fuzz}$-actual FC.
The controller is stable for $$K_{Fuzz|max}>=F^-+D+v+\eta \quad (7)$$

In order to suppress further unmodeled frequencies $v_u$, it must hold that $$\frac{K(x,t)_{max}}{\Phi}<=\lambda<<v_u \quad (8)$$

In the case of a sampling system having a sampling frequency $v_{sample}$ and a time constant $\pi_{plant}$ of the process to be controlled, it is necessary, furthermore, to select $\lambda$ such that $$\lambda<\frac{v_{sample}}{2(1+\tau_{plant}v_{sample})} \quad (9)$$

The actual fuzzy control term $K_{Fuzz}$ is characterized in that instead of the error and its derivatives the distance $s_p$ of the state vector from the sliding surface SS (from the switching straight line in the 2-dimensional case) and distance d from the direction of the normal vector of the sliding surface SS, which is a switching hypersurface, are evaluated in the condition part of the fuzzy rules. This corresponds to the transformation of the n-dimensional phase plane into a 2-dimensional $s_p$-d plane. This measure prevents the exponential rise of rules with the increase in system order. The individual control steps then comprise that a) an error vector $\underline{e}$ is formed from desired values and controlled variables of the process;

b) the error vector $\underline{e}$ is normalized to a normalized error vector $\underline{e}_N$ having the property that $d_N$ is situated within a bounded phase region;

c) $\underline{e}_N$ is used to form a normalized sliding surface (SS), which is given by $s(\underline{x},t)=0$ and by means of which the sign of the manipulated variable u to be specified is determined;

d) the distances $s_p$ between $\underline{e}_N$ and $s=0$ as well as d between $\underline{e}_N$ and the normal vector $\underline{n}_N$ from $s=0$ are formed, and $s_p$ and d are fuzzified on the basis of prescribed membership functions;

e) the fuzzy vector $\mu_{uN}$ of the normalized manipulated variable $u_N$ is formed with the aid of i fuzzy rules of the form IF $s_p=s_{pi}$ AND $d=d_i$ THEN $u_N=u_{Ni}$;

f) a crisp normalized manipulated variable $u_N$ is formed from the fuzzy vector $\mu_{uN}$ by defuzzification:

g) a physical manipulated variable $u^-=-K_{Fuzz}(e,\lambda)$ is formed from $u_N$ with the aid of a previously determined denormalization factor;

h) a compensation component $$u_{Komp}=-\Sigma_{k=1,\ldots,n-1}\binom{n-1}{k}\lambda^k e^{(n-k)}$$

is formed, and the manipulated variable $u=u_{Komp}+u^-\cdot sat(s/\phi)$ is switched on to the system.

The normalization factors are determined as follows:
The sliding surface SS in the normalized phase plane is given by $$(d/dt+\lambda_N)^{(n-1)}e_N=0 \quad (11)$$

In addition, let $N_e, N_{e1}, \ldots$ be the normalization factors for $e, e^1, \ldots$ where $$e_N=N_e\cdot e; \ e^{(1)}_N=e^{(1)}N_e^{(1)}$$

After inserting the normalized state vector $\underline{e}_N$ in equation (4) and comparing coefficients, this yields $$\frac{N_e(n-2)}{N_e(n-1)}=\ldots=\frac{N_e}{N_e(1)}=\lambda/\lambda_N$$

$\lambda_N$ is equated to one for the sake of simplicity, with the result that after k has been chosen in accordance with the abovenamed criteria all that remains open is to select one of the $N_{e(k)}$ in order to be able to determine all the normalization factors. This purpose is served by $N_e$, which is determined in such a way that the operating point of the controller is placed reliably into the normalized interval of $e_N$. An improvement in the control response by changing $N_e$ can be performed by means of an appropriate learning procedure. The normalized $K_{FuzzN}$ is calculated within the normalized $s_p$-d plane using rules of the type IF $s_{pN}=s_{pNi}$ AND $d_N=d_{Ni}$ THEN $K_{FuzzN}=K_{FuzzNi}$ (12)

Finally, the design specifications for formulating the rules in the normalized $s_{pN}$-$d_N$ plane remain to be determined:

1. $K_{FuzzN}$ is to rise with rising $|s_{pN}|$ and fall with falling $|s_{pN}|$, and
2. $K_{FuzzN}$ is to rise with rising $|d_N|$ and fall with falling $|d_N|$.

The selection of the denormalization factor $N_D$ is performed as follows: let $K_{FuzzN|max}$ be the maximum possible output of the normalized fuzzy controller. Furthermore, let $K_{Fuzz|max}$ be known from the estimate (7). The denormalization factor is then yielded as $$N_u = \frac{K_{Fuzz|max}}{K_{FuzzN|max}} \quad (13)$$

B. Demonstration Example

The aim is to use a robot to track a contour in a force-adaptive fashion. Applications of this are to be found in robot-guided cleaning of castings, track-mounted welding, bonding etc. The object is to use the robot effector (tool, gripper) to track a surface contour which is not completely known a priori with a constant force. The forces acting between effector and surface are measured using a force sensor. The force error between the desired and actual values is passed to the fuzzy controller, whose output (manipulated variable) is a position correction of the robot arm. It is assumed that the entire dynamics are located in the effector or in the surface. A further simplification is to limit the dynamic calculation to one coordinate direction. The effector is a spring-mass damper system and the surface can be modeled as a spring. As depicted in FIG. 1, the effector is represented by a mass M, a spring constant K1 and a damping element C that forms the spring-mass system. The surface has a spring constant K2. The corresponding differential equation is then:

$$m \cdot y^{(2)} + c \cdot (y^{(1)} - y^{(1)}_0) - m \cdot g \cdot K1 \cdot (y - y_0 - D) + K2 \cdot (y - y_c + r + A) = 0 \quad (B1)$$

Equation (B1) is a force balance equation of the following type (see FIG. 1):

$$F_T + F_D - F_G + F_F + F_O = 0 \quad (B2)$$

where
$F_T$-inertial force
$F_D$-damping force
$F_G$-force due to weight
$F_F$-spring force
$F_O$-surface force.

The sensor force may be represented by the spring force $F_F$. This yields, with $$F_F = K1 \cdot (y - y_0 - D);$$
$$F^{(1)}_F = K1 \cdot (y^{(1)} - y^{(1)}_0);$$
$$F^{(2)}_F = K1 \cdot (y^{(2)} - y^{(2)}_0) \quad (B3)$$

an equation for the spring force (sensor force) $F_F$:

$$F^{(2)}_F = -\frac{c}{m} \cdot F^{(1)}_F + K1 \cdot g - \frac{K1}{m} \cdot F_F - \frac{K1}{m} \cdot F_0 - K1 \cdot y^{(2)}_0 \quad (B4)$$

In this case, $$U = -K1 \cdot y^{(2)}_0 \quad (B5)$$

is the manipulated variable which is to be generated by the controller.

The concrete parameters are:
C=50 kg/s
m=0.05 kg
K1=5000 kg/s$^2$
$\tau_{sample}$=0.01 s The comparison of equation (B1) in point 3 and equation (B4) yields $$x(t) \Rightarrow F_F(t)$$
$$x^{(n)}(t) \Rightarrow F^{(2)}_F$$
$$f(x,t) \Rightarrow -\frac{c}{m} \cdot F^{(1)}_F + K1 \cdot g - \frac{K1}{m} \cdot F_F - \frac{K}{m} \cdot F_0$$

Furthermore, it holds that $$s = \lambda e + e^{(1)}$$
$$e = F_F - F_{Fd}$$

The controller, which corresponds to equation (6) of the preceding section, has the following form for the two-dimensional case $$u = -\lambda \cdot e^{(1)} - K_{Fuzz}(e, e^{(1)}, \lambda) \cdot sat(s/\phi) \quad (B6)$$

The $F^-$ in equation (7) of the preceding section is equal to $$F^- = -\frac{c}{m} F^{(1)}_F + K1 \cdot g - \frac{K1}{m} \cdot F_F - \frac{K1}{m} \cdot F_0$$

The distances $s_{pN}$ and $|d_N|$ of the state vector e from the SS or from the straight line normal to the SS in the normalized phase plane are $$s_{pN} = (e_N + e^{(1)}_N)/\sqrt{2} \quad (B7)$$

and $$|d_N| = |(-e_N + e^{(1)}_N)|/\sqrt{2} \quad (B8)$$

The following fuzzy sets are defined for the normalized values $s_{pN}$ and $|d_N|$ as well as for the normalized control $u_N$:
PSS-positive $s_{pN}$ small
PSB-positive $s_{pN}$ big
NSS-negative $s_{pN}$ small
NSB-negative $s_{pN}$ big
DS-$d_N$ small
DB-$d_N$ big
PUS-positive $u_N$ small
PUB-positive $u_N$ big
NUS-negative $u_N$ small
NUB-negative $u_N$ big.

Figure 2:
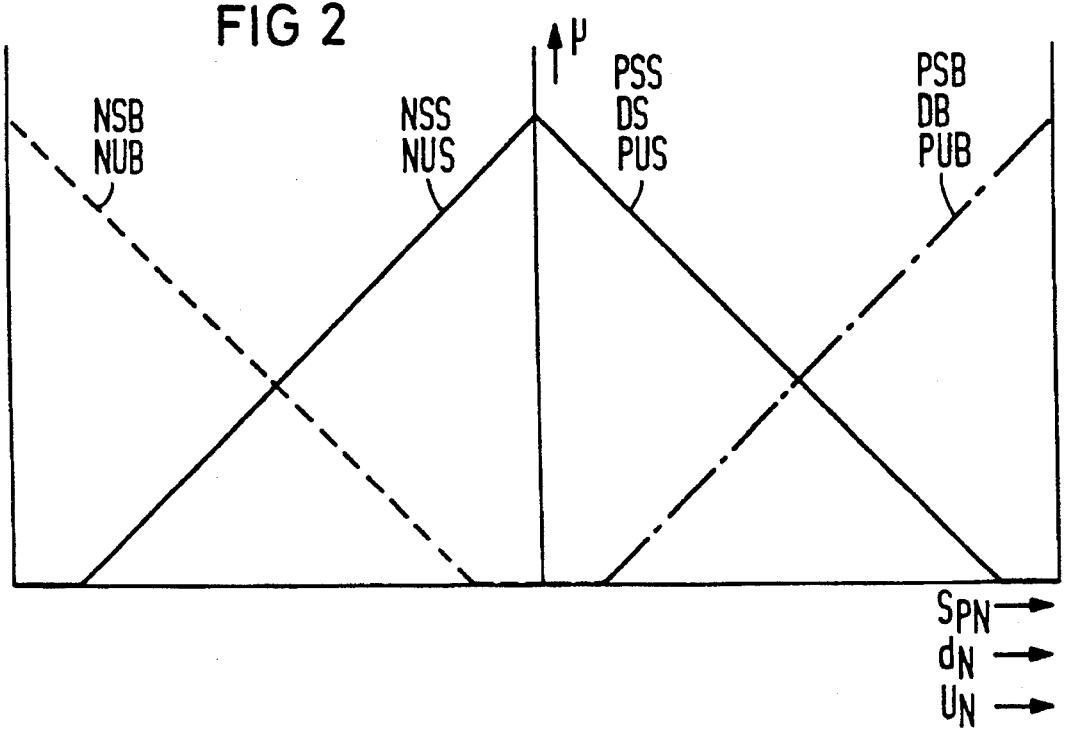
FIG. 2 shows the membership functions of a demonstration example of the controller according to the invention of the dynamic system from FIG. 1.

FIG. 2 shows the corresponding membership functions. The rules for forming the control $u_N$ are:

$s_{pN} > 0$

IF *PSS* AND *DS* THEN *NUS*
　　if ((*PSS* AND *DB*) OR *PSB*) THEN *NUB*

$s_{pN} <= 0$

IF *NSS* AND *DS* THEN *PUS*
　　IF ((*NSS* AND *DB*) OR *NSB*) THEN *PUB*.

The following parameters were selected for the controller:

$$N_e = 100 \frac{s^2}{kg \cdot m}$$

$$N_e(1) = 6,5 \frac{s^3}{kg \cdot m}$$

$$N_u = 50 \frac{kg \cdot m}{s^4}$$

$$\Phi = 2.5 \text{ m/s}$$

$$Fd = 10 N$$

v=0.2 m/s (forward speed).

Figure 3A:
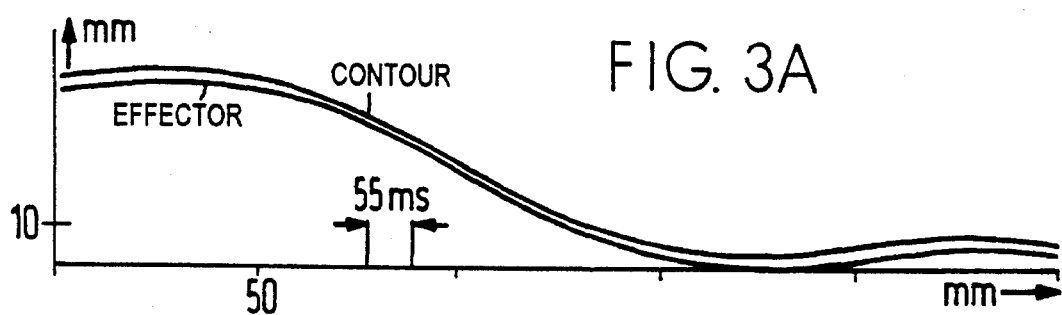
FIG. 3 shows the tracking of a sinusoidal, inclined contour by a robot effector equipped with force sensors.
Figure 3B:
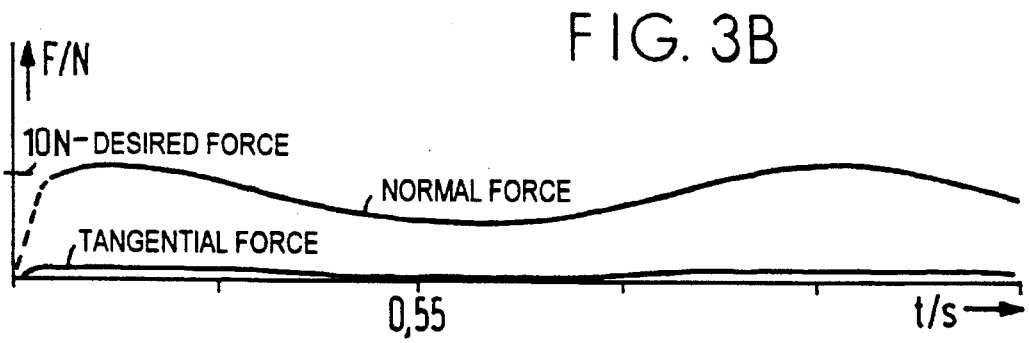
Figure 3C:
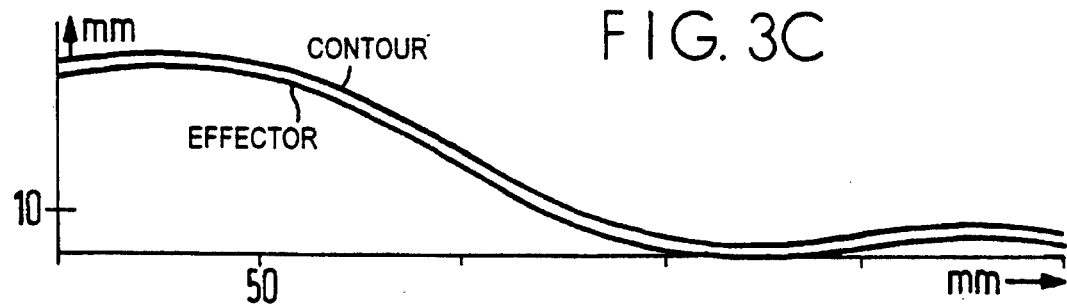
Figure 3D:
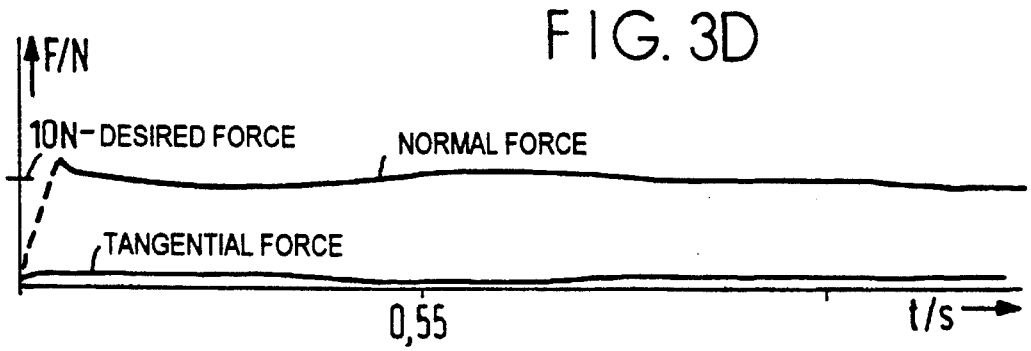

FIG. 3 shows the tracking of a sinusoidal, inclined contour by a robot effector which is fitted with a force sensor and which has been modeled by the spring-mass damping system according to equation (B1) (see FIG. 3a for the PD controller and FIG. 3b for the fuzzy controller).

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. In a computer system, a method for controlling dynamic nth-order systems, comprising the steps of: producing a manipulated variable u as a sum of a linear compensation term C and a product term P, the compensation term C being a linear combination of a contouring error e and its time derivatives $e^{(n-k)}$, and the product term being formed by multiplying a fuzzy control term $K_{Fuzzy}$ by a saturation term, sat; and using the manipulated variable μ for controlling at least a system component of a dynamic nth-order system;

the linear compensation term being given by $$C = -\Sigma_{k=1,\ldots,n-1} \binom{n-1}{k} \lambda^k e^{(n-k)}$$

e denoting the contouring error, $e^{(n-k)}$ denoting the time derivatives of e, λ denoting a reciprocal time constant, and n denoting the order of the dynamic system;

the saturation term, sat, depending on time derivatives of the contouring error and a boundary layer constant φ>0 in accordance with the formula $$sat(s/\Phi) = \begin{pmatrix} s/\Phi \text{ for } |s/\Phi| < 1 \\ sgn(s/\Phi) \text{ for } |s/\Phi| >= 1 \end{pmatrix};$$

the fuzzy control term $K_{Fuzzy}$ being selected such that $$K_{F/max} >= F^- + D + V + \eta$$

when $F^-(\underline{x},t) >= |f(\underline{x},t)|$, $D(\underline{x},t) >= |d(t)|$ and $v(t) >= |x_d^{(n)}(t)|$, and $\underline{x}(t)$ denoting a state vector of the system, d(t) denoting disturbances of the system dynamics, $f(\underline{x},t)$ denoting nonlinear system components, t denoting time, and η denoting a non-negative constant.

2. The method as claimed in claim 1, wherein a sliding surface is formed and wherein the fuzzy control term $K_{Fuzzy}$ is determined by fuzzy rules in whose condition part a distance, $s_p$, of a state vector $\underline{x}$ from the sliding surface and a distance d of the state vector $\underline{x}$ from a direction of a normal vector of the sliding surface are determined.

3. The method as claimed in claim 2, wherein a) an error vector $\underline{e}$ is formed from desired values and controlled variables of the process;

b) the error vector $\underline{e}$ is normalized to a normalized error vector $\underline{e}_N$ having the property that a normalized $d_N$ is situated within a bounded phase region;

c) the normalized error vector $\underline{e}_N$ is used to form the sliding surface, which is given by $s(\underline{x},t)=0$ and by means of which a sign of the manipulated variable u to be specified is determined;

d) the distances $s_p$ between $\underline{e}_N$ and s=0 as well as d between $\underline{e}_N$ and the normal vector $\underline{n}_N$ from s=0 are formed, and $s_p$ and d are fuzzified on the basis of prescribed membership functions;

e) the fuzzy vector $\mu_{uN}$ of the normalized manipulated variable $u_N$ is formed with the aid of i fuzzy rules of the form IF $s_p=s_{pi}$ AND $d=d_i$ THEN $u_N=u_{Ni}$;

f) a crisp normalized manipulated variable $u_N$ is formed from the fuzzy vector $\mu_{uN}$ by defuzzification:

g) a physical manipulated Variable $u^- = -K_{Fuzz}(\underline{e},\lambda)$ is formed from $u_N$ with the aid of a previously determined denormalization factor;

h) a compensation component $$u_{Komp} = -\Sigma_{k=1,\ldots,n-1} \binom{n-1}{k} \lambda^k e^{(n-k)}$$

is formed, and the manipulated variable $u = u_{Komp} + u^- \cdot sat(s/\phi)$ is switched onto the system.

* * * * *